US012722944B2

(12) United States Patent
Palet

(10) Patent No.: US 12,722,944 B2
(45) Date of Patent: Sep. 1, 2026

(54) PERSONAL SAFETY AND FALL PROTECTION SYSTEMS

(71) Applicant: Fall-Botics, LLC, Florence, WI (US)

(72) Inventor: Timothy James Palet, Florence, WI (US)

(73) Assignee: Fall-Botics, LLC, Florence, WI (US)

( * ) Notice: Subject to any disclaimer, the term of this patent is extended or adjusted under 35 U.S.C. 154(b) by 0 days.

(21) Appl. No.: 18/784,340

(22) Filed: Jul. 25, 2024

(65) Prior Publication Data

US 2024/0375917 A1 Nov. 14, 2024

Related U.S. Application Data

(63) Continuation of application No. 18/048,482, filed on Oct. 21, 2022, now Pat. No. 12,054,364.

(60) Provisional application No. 63/325,396, filed on Mar. 30, 2022, provisional application No. 63/271,256, filed on Oct. 25, 2021, provisional application No. 63/270,090, filed on Oct. 21, 2021.

(51) Int. Cl.

*B66C 23/44* (2006.01)
*A62B 35/00* (2006.01)
*B66C 23/16* (2006.01)
*B66C 23/70* (2006.01)
*B66C 23/80* (2006.01)

(52) U.S. Cl.

CPC .......... *B66C 23/44* (2013.01); *A62B 35/0068* (2013.01); *B66C 23/166* (2013.01); *B66C 23/705* (2013.01); *B66C 23/80* (2013.01)

(58) Field of Classification Search

CPC ..... A62B 35/0068; B66C 23/44; B66C 23/80; B66C 23/166; B66C 23/705
See application file for complete search history.

(56) References Cited

U.S. PATENT DOCUMENTS

| | | | |
|---|---|---|---|
| 1,520,768 | A | 12/1924 | Owen |
| 4,008,669 | A | 2/1977 | Sumrell |
| 4,015,686 | A | 4/1977 | Bushnell, Jr. |

(Continued)

FOREIGN PATENT DOCUMENTS

| | | | | |
|---|---|---|---|---|
| CN | 112707317 A * | 4/2021 | ............. | B66C 23/84 |
| NL | 2024387 B1 | 8/2021 | | |

OTHER PUBLICATIONS

Capital Safety, The Ultimate in Fall Protection Full Line Catalog, dated 2012.

(Continued)

*Primary Examiner* — Eret C McNichols

(74) *Attorney, Agent, or Firm* — Andrus Intellectual Property Law, LLP

(57) ABSTRACT

A personal safety system for lifting material or supporting person therefrom includes a base and a mast rotatably coupled to the base. The mast has a plurality of mast sections that telescope relative to each other along an axis such that the mast is movable into and between a lowered configuration and an extended configuration. A jib is coupled to the mast and a cable is coupled to the jib such that a cable is configured to couple to the material or the person such that the system is capable of lifting the material or supporting the person. An attachment device coupled to the base is configured to permit a vehicle to couple to the system via the attachment device.

17 Claims, 6 Drawing Sheets

(56) References Cited

U.S. PATENT DOCUMENTS 4,096,952 A 6/1978 Diggs
4,171,032 A 10/1979 Jenkins
4,487,537 A 12/1984 Morse
4,511,015 A 4/1985 Purdy
4,607,724 A 8/1986 Hillberg
4,607,990 A 8/1986 Eggers
4,619,346 A 10/1986 Deguerry
4,660,730 A 4/1987 Holmes
4,705,140 A 11/1987 Dudley
4,724,924 A 2/1988 Breyer
4,725,033 A 2/1988 Zinnecker
4,852,692 A 8/1989 Flaherty
4,942,943 A 7/1990 Flaherty
5,021,917 A 6/1991 Pike
5,107,955 A 4/1992 Kishi
5,113,969 A 5/1992 Drolet
5,143,010 A 9/1992 Behr
5,307,898 A 5/1994 Purdy
5,645,180 A 7/1997 Zaguroli, Jr.
5,996,722 A 12/1999 Price
6,082,561 A 7/2000 Bembas
6,095,349 A 8/2000 O'Meara
6,138,991 A 10/2000 Myers, Jr.
6,250,483 B1 6/2001 Frommer
6,378,652 B1 4/2002 Albert
6,467,576 B2 10/2002 Figura
6,821,075 B2 11/2004 van der Horn
6,830,423 B1 12/2004 Williams
6,951,345 B2 10/2005 Wilks
6,981,834 B1 1/2006 Henry
7,032,710 B2 4/2006 Anderson
7,156,246 B2 * 1/2007 Sherrod .................. B66C 23/44
414/462
7,543,671 B2 6/2009 Donaldson
7,828,116 B2 11/2010 Vetesnik
7,845,622 B1 12/2010 Riggs
7,926,787 B2 4/2011 Wieland
8,505,684 B1 8/2013 Bogue
8,925,679 B2 1/2015 Vetesnik
9,410,332 B2 8/2016 Patton
9,623,270 B2 4/2017 Palet
9,630,816 B1 4/2017 Napieralski
9,744,386 B2 8/2017 Baughman
10,123,527 B1 11/2018 Leger, Sr.
10,125,503 B2 11/2018 Misiolek
10,174,878 B2 1/2019 Kaytes
10,347,109 B2 7/2019 Troy
10,456,608 B2 10/2019 Johanneck
10,463,895 B2 * 11/2019 Palet .................. F16M 11/2021
10,743,532 B1 * 8/2020 Latham ............... A01M 31/006
11,285,346 B2 3/2022 Palet
11,459,780 B2 10/2022 Martin Iglesias
11,465,888 B2 10/2022 Laidler
11,603,675 B2 3/2023 Nichols
11,638,843 B2 5/2023 Jones
11,795,712 B2 10/2023 Head
11,801,405 B2 10/2023 Sargent
2002/0121577 A1 9/2002 Metelski
2004/0195041 A1 10/2004 Vetesnik
2005/0034920 A1 * 2/2005 Anderson .......... A62B 35/0068
182/3
2005/0169735 A1 8/2005 Pelsue
2006/0208240 A1 9/2006 Spittle
2008/0002967 A1 1/2008 Chapman
2009/0145871 A1 6/2009 Bond
2010/0126801 A1 5/2010 Begin
2010/0200822 A1 8/2010 Kitchens, Sr.
2011/0033293 A1 2/2011 Cavalieri
2012/0138386 A1 6/2012 Robitaille
2012/0193165 A1 8/2012 Vetesnik
2013/0240683 A1 9/2013 Fusy
2013/0284688 A1 10/2013 Narcisco
2013/0313396 A1 11/2013 Vetesnik
2014/0076659 A1 3/2014 Terry
2014/0090927 A1 4/2014 Patton
2015/0375020 A1 * 12/2015 Palet .................. A62B 35/0068
248/122.1
2016/0271430 A1 * 9/2016 Baughman ............. F16M 11/42
2016/0376806 A1 12/2016 Vetesnik
2017/0225017 A1 * 8/2017 Johanneck ......... A62B 35/0068
2017/0225018 A1 * 8/2017 Palet ...................... F16M 11/38
2017/0247236 A1 8/2017 Svoboda
2017/0370114 A1 12/2017 Kornijenko
2018/0126198 A1 * 5/2018 Troy ..................... B66F 11/044
2018/0142834 A1 5/2018 Cuttill
2020/0016440 A1 * 1/2020 Palet .................. A62B 35/0068
2022/0119230 A1 * 4/2022 Laidler ................... B66C 23/44
2022/0119231 A1 4/2022 Laidler
2022/0203146 A1 * 6/2022 Palet .................. A62B 35/0068
2022/0362593 A1 11/2022 Strauss
2022/0379147 A1 12/2022 Strauss
2022/0379148 A1 12/2022 Strauss
2023/0127292 A1 4/2023 Palet

OTHER PUBLICATIONS

Capital Safety, The Ultimate in Fall Protection Product Catalog, dated 2013.
Capital Safety, The Ultimate in Fall Protection Product Catalog, dated 2014.
Gorbel Free Standing Articulating Jib Crane Manual, dated 2009.
Gorbel Introduction to Jib Cranes Manual, dated 2012.
Gorbel Tether Track, Free Standing Cantilever Rigid Rail Anchor Systems Manual, dated 2012.
Gorbel Tether Track, Fold Away Systems Manual, dated 2012.
Gorbel TSJ50, Tool Solutions Manual, dated 2012.
Gorbel Free Standing Jib Crane Manual, dated 2013.
Gorbel Tether Track, Ceiling Mounted Rigid Rail Anchor Systems Manual, dated 2013.
Rigid Lifelines, Fall Protection Solutions Catalog, 2014.
Tuff Built Products, Inc., Sky-X-Stand Hitch Mount Anchor Points, dated Jan. 27, 2011.
Tuff Built Products, Inc. Catalog, dated Oct. 2012.
Tuff Built Products, Inc., Sky-X-Stand Pro-7, dated Nov. 22, 20212.
Tuff Built Products, Inc., Sky-X-Stands Single Anchor Point Counterweight Trailer System, dated Dec. 11, 20212.

* cited by examiner

PERSONAL SAFETY AND FALL PROTECTION SYSTEMS

CROSS-REFERENCE TO RELATED APPLICATIONS

The present disclosure is a continuation of patent application Ser. No. 18/048,482, filed Oct. 21, 2022, which is based on and claims priority to U.S. Provisional Patent Application Nos. 63/270,090, filed Oct. 21, 2021, 63/271,256 filed Oct. 25, 2021, and 63/325,396 filed Mar. 30, 2022, all of which are incorporated by reference herein in their entireties.

FIELD

The present disclosure relates to personal safety and fall protection, and specifically to fall and safety systems that are moved by vehicles.

BACKGROUND

The following U.S. Patent is incorporated herein by reference in its entirety.

U.S. Pat. No. 9,623,270 discloses examples of personal safety apparatuses and systems.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a personal safety system for lifting material or supporting person therefrom includes a base and a mast rotatably coupled to the base. The mast has a plurality of mast sections that telescope relative to each other along an axis such that the mast is movable into and between a lowered configuration and an extended configuration. A jib is coupled to the mast and a cable is coupled to the jib such that a cable is configured to couple to the material or the person such that the system is capable of lifting the material and/or supporting the person. An attachment device coupled to the base is configured to permit a vehicle to couple to the system via the attachment device.

In certain examples, a personal safety system for lifting material and/or supporting person therefrom having a base with a front, an opposite rear, a first side, and an opposite second side. A mast is rotatably coupled to the base, and the mast has a plurality of mast sections that telescope relative to each other along an axis such that the mast is movable into and between a lowered configuration and an extended configuration. A jib is coupled to the mast and a cable is coupled to the jib such that a cable is configured to couple to the material or the person such that the system is capable of lifting the material and/or supporting the person. An attachment bracket is coupled to the base and configured to permit a vehicle to couple to the system via the attachment device. The attachment bracket is coupled to the rear such that the attachment device is configured to face the vehicle, and a plurality of legs are to the base and configured to be selectively movable to thereby contact the ground and support the system on the ground.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

FIGS. 1-4 depict an example personal safety system 10 of the present disclosure, and the system 10 is utilized to reduce the risk of injury or death of a worker(s) falling from an elevated worksurface. The system can additionally or alternatively be utilized for handling and/or hoisting of materials. The systems 10 can be utilized in a wide range of locations and industries such as construction project sites, industrial processing facilities, and maintenance yards.

Figure 1:
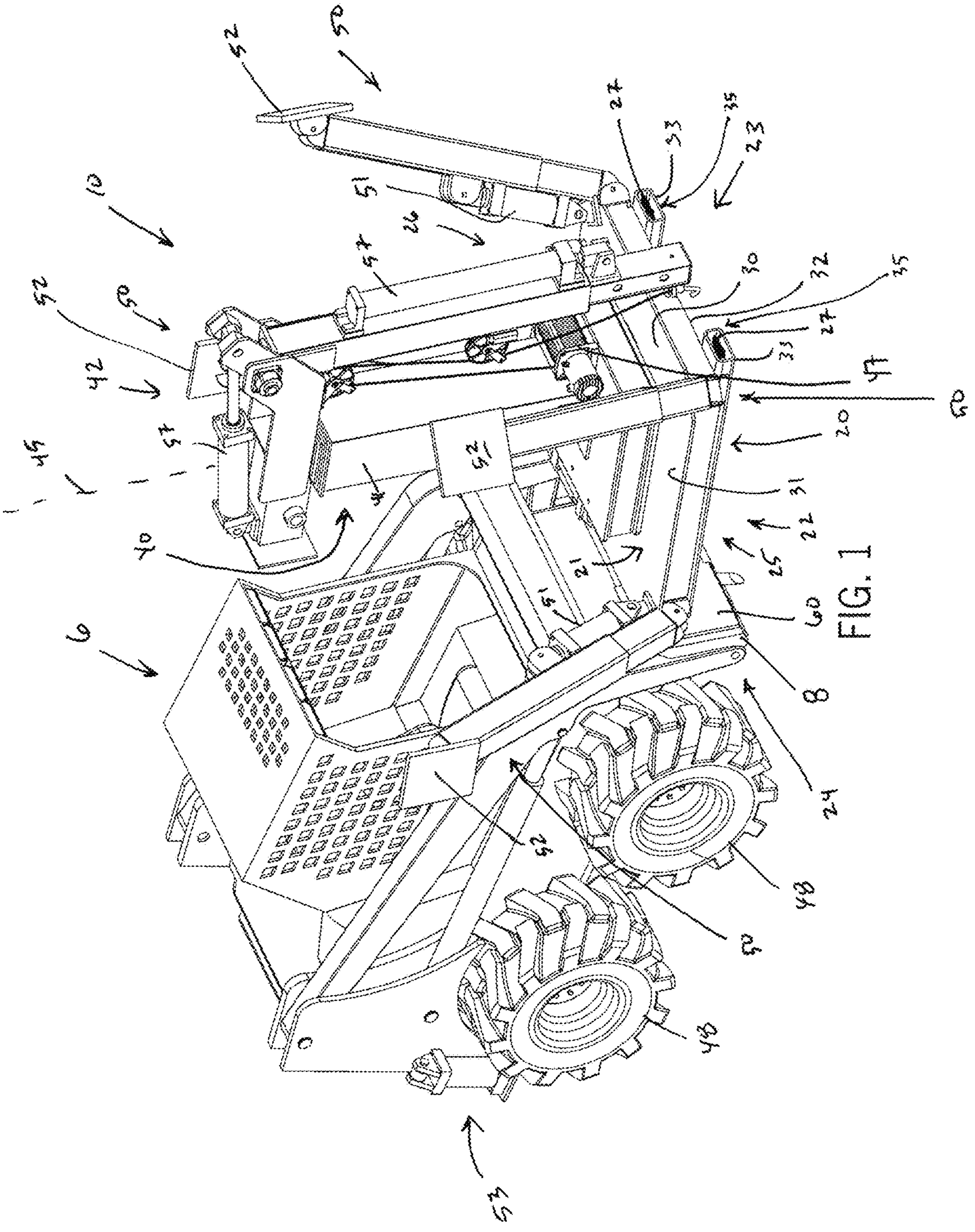
FIG. 1 is a perspective view of a vehicle coupled to a system of the present disclosure. The system is in a transport configuration.

FIG. 1 depicts the system 10 coupled to a vehicle 6, such as a skid-steer or forklift. Note that in other examples, the system 10 is operated and utilized separate from or without being coupled to a vehicle 6. Some of the example systems 10 described herein describe the spatial relationship and/or connections between the vehicle 6 and the system 10 are described in greater detail herein below. Note that any of the components or features of any one of the example systems 10 described herein may be combined with any other of the systems 10. Similarly, any components or features of the example systems 10 of the present disclosure can be combined with any features, components, systems, and/or apparatuses described in the above-incorporated provisional patent applications and the above-incorporated U.S. Pat. No. 9,623,270.

The system 10 includes a base 20 including a top 21, a bottom 22, a front 23, rear 24, and a pair of opposing sides, namely a first side 25 and a second side 26. A plate 30 extends across the top 21 and defines a top surface 31 to which other components of the system 10 can be mounted. The plate 30 also has a bottom surface 32. In the example depicted in FIG. 1, a pair of rails 33 are coupled to the bottom surface 32. The rails 33 are spaced apart from each other at each side 25, 26, and the each rail 33 extends between the front 23 and the rear 24. In certain examples, the rails 33 extend parallel to each other. The rails 33 are exemplarily rectangular tubes. Each rail 33 defines a channel 35 (or an opening or groove) configured to receive a fork 27 of the vehicle 6. As such, the operator of the vehicle 6 may move the vehicle 6 such that the forks 27 are received in the channel 35 to thereby engage the rails 33 to transport the system 10 to different locations. As described in further detail herein, the system 10 is further configured to couple to the vehicle 6.

A mast 40 is coupled to the top surface 21 of the base 20. One or more support plates and/or gussets (not depicted) may support the mast 40 on the base 20. The mast 40 has an axis 45, and the mast 40 includes one or more mast sections 41 that telescope relative to each other along the axis 45. The mast 40 is rotatable about the axis 45 (see for example different rotational positions of the mast 40 in FIG. 2 and FIG. 4). In certain examples, a pivot device, such as bearings or a pivot plate 46, of the mast 40 is coupled to the top surface 21 and facilitates rotation of the mast 40. In certain examples, an actuator 49, such as a hydraulic cylinder, is coupled between a section 41 of the mast 40 and the plate 30. The actuator 49 is configured to rotate the mast 40 about the axis 45. The actuator 49 can also function to hold the mast 40 in a position to which it has been rotated.

A jib 42 is coupled to the mast 40 and radially extends therefrom. The jib 42 is movable into and between different positions, and the jib 42 is configured to support a load therefrom such as construction materials or one or more workers. The system 10 includes a cable 43 that extends along the jib 42 and/or the mast 40 to the winding machine 47 such as a winch (see FIG. 4). One or more wheels 48 are attached to the jib 42 to the support the cable 43. The free end of the cable 43 can include a hook or another device (e.g., eyelet, bolt, loop, carabiner) for connecting to materials and/or a personal safety harness. In one specific example, the cable 43 is coupled via wires to a pallet of roofing shingles such that the system 10 by actuating the winding machine 47 to wind the cable 43 thereon and lift the pallet off the ground to an elevated worksurface. In another example, the cable 43 is coupled to a personal safety harness 44 on a worker. As such, as the cable 43 is wound by the winding machine 47 the worker is lifted by the system 10 onto an elevated worksurface or supported at a desired elevation. Note that extensions, tic-off points, harnesses, and the like can be connected to the jib 42. In certain examples, the jib 42 can include interchangeable jib attachments to increase the functionality of the jib 42. For instance, the jib 42 can include an extension member to increase the length of the jib 42 or a specialized tool attachment (e.g., motorized winch) for further lifting materials.

Figure 4:
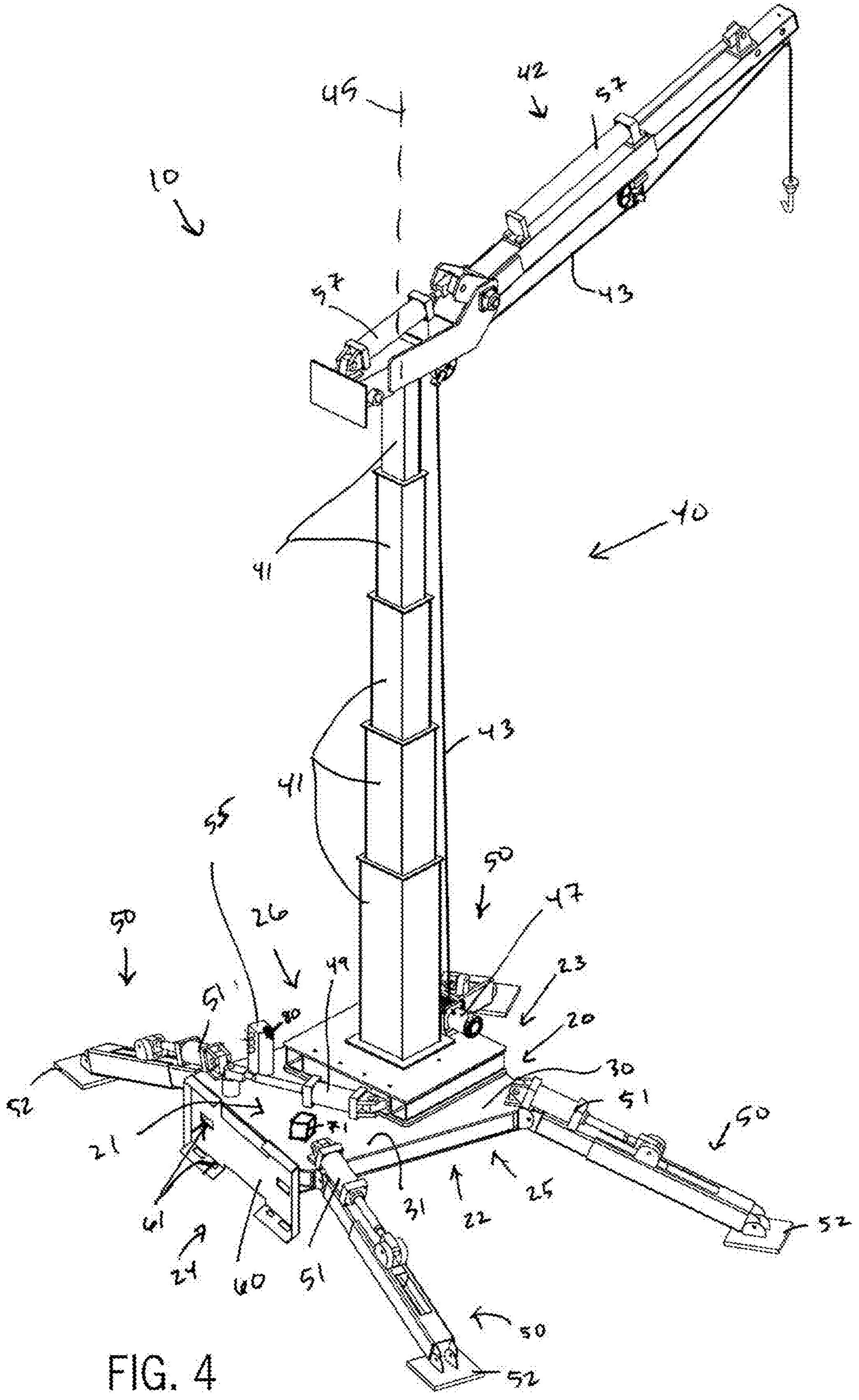
FIG. 4 is a perspective view of the system life FIG. 2 with a boom extended and a jib extended.

An actuator (not depicted), such as a hydraulic piston, may operate to thereby move the mast sections 41 relative to each other to thereby increase or decrease the height of the mast 40 relative to the base 20. As such, the mast 40 can be moved into and between any number positions. It will be recognized that such actuators and/or related components can be positioned and routed internally in the mast 40. FIG. 1 depicts the mast in a lowered configuration (e.g., the lowered configuration in which the mast 40 has a minimum height) in which the mast sections 41 are nested in each other. FIG. 4 depicts the mast 40 in the extended configuration (e.g., a first extended position in which the mast 40 is at a maximum height, a second extended position in which the mast 40 is at a height between the minimum height and the maximum height). A person of ordinary skill in the art will recognize that the mast 40 can be moved into any configuration between the lowered configuration (FIG. 1) and the extended configuration (FIG. 4). Additionally, one or more actuators, such as hydraulic pistons or cylinders 57, may be actuated to thereby move the jib 42 into and between a retracted position (FIG. 1) and one or more radially extended positions (for example see FIG. 4). In certain examples, the jib 42 has jib sections (not depicted) that telescope relative to each other such that the length of the jib 42 can vary. The actuators may be part of an actuator system on the system 10.

One or more legs 50 are also coupled to the top surface 21. Each leg 50 is moveable from a raised position (FIG. 1) to a ground-engaging position (FIG. 3) to provide selective additional stabilization for the system 10. The leg 50 is moved by one more actuators, such as hydraulic cylinders 51. The cylinder 51 is actuated to thereby pivot the leg 50 from a raised position (FIG. 1) in which a foot 52 is raised above the ground (see FIG. 1) to a ground-engaging position (see FIG. 3) in which the foot 52 engages the ground. When the legs 50 are in the ground-engaging position (FIG. 3), the legs 50 stabilize or level the system 10 relative to the ground, and when the legs 50 are in the raised position (FIG. 1), the vehicle 6 can move the system 10 to different worksites. The number of legs 50 and/or feet 52 can vary, and in certain examples, additional legs 50 and/or feet 52 are coupled to the vehicle 6 (see FIG. 6), hereafter referred to as vehicle legs 53. The vehicle legs 53 can be integral with the vehicle 6 or coupled to the vehicle 6 when the vehicle 6 is engaging or moving the system 10. Note that the system 10 can include a controller 80 (described further hereinbelow) that provides control signals to and controls the actuators (e.g., hydraulic cylinders 51, 57) to thereby move components of the system 10 such as the mast 40, the jib 42, and/or the legs 50, 53.

Figure 7:
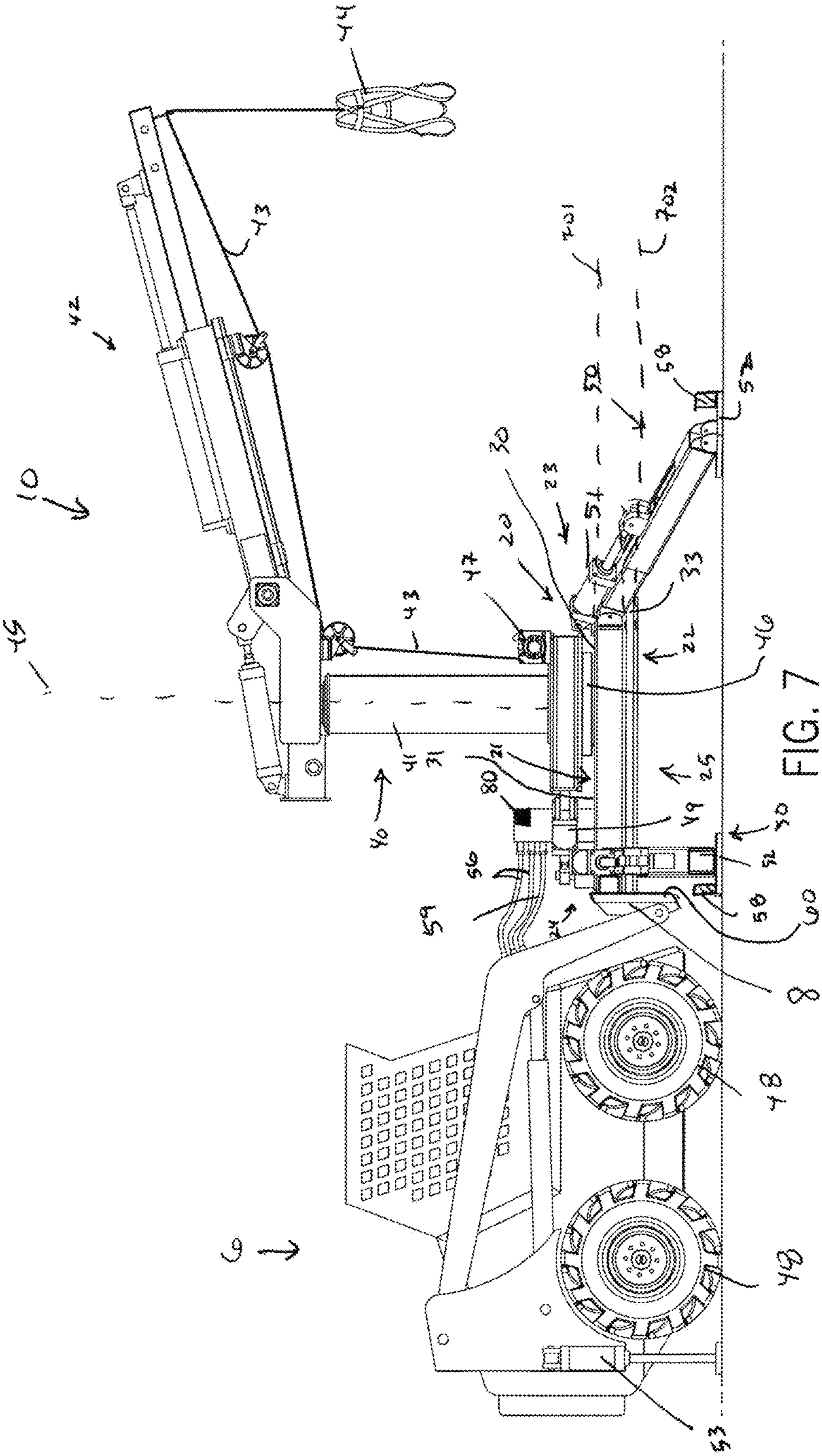
FIG. 7 is a side view of an example vehicle in a support configuration and the fall protection system in the support configuration.

Referring to FIG. 7, the legs 50 are depicted in ground-engaging positions to thereby support the system 10. Each leg 50 has a foot 52 (e.g., plate) that engages the ground. The cylinders 51 on the legs are connected to hydraulic system of the system 10 or the vehicle 6 via hoses. Note that in certain examples, the legs 50 are movable along the perimeter of the base 20 such that the legs 50 can be located in different positions along the perimeter of the base. Moving the legs 50 into different positions along the perimeter of the base 20 allows the operator to optimize the utility of the system 10 (e.g., increase the reach of the system 10 and the attached jib 42) and utilize the system 10 in locations where clearance around the system 10 is limited or obstructed. For instance, the legs 50 can be moved along the perimeter such that the legs 50 extend from the corners of the base 20 when in ground-engaging positions. The legs 50 can be manually moved by the operator e.g., the legs 50 include locking/unlocking devices that permit the operator to unlock the position to legs 50 and thereby move the legs 50 along the perimeter of the base via a track and relocked the leg 50 to the base 20. In other examples, hydraulic cylinders move the legs 50 into different positions along the perimeter of the base 20. Note that in other examples, the legs 50 are connected to the base 20 at a fixed locations.

In certain examples, the system 10 includes a leveling assembly 58 (FIG. 7) is for further leveling the system 10 relative to the ground after the foot 52 of the leg 50 engages the ground. The leveling assembly 58 can include an actuator, such as a hydraulic cylinder that extends a piston into contact with the ground, to level the system 10. The leveling assembly 58 is thereby configured to "fine tune" the level of the system 10 relative to the ground. In certain examples, the leveling assembly 58 can be independent from the other electrical and/or hydraulic systems of the system 10. In other examples, the leveling assembly 58 is part or integrally connected with the other electrical and/or hydraulic systems of the system 10. Note that in certain examples, the leveling assemblies 58 may lift the base system relative to the ground.

The system 10 includes an attachment bracket 60 that couples a vehicle 6 to the system 10. Note that structural variations of the attachment bracket 60 as depicted and described herein are contemplated while remaining within the scope of the present disclosure. The attachment bracket 60 includes a body 600 which may be exemplarily constructed as a plate or with one or more apertures and thereby constructed as a frame (not depicted). In certain examples, the vehicle 6 includes an adapter 8, such as an adapter mechanism or adapter plate, (see FIG. 6) that engages with the attachment bracket 60. The adapter plate exemplarily includes a generally vertically-extending portion. Adapters 8 may further include generally horizontally extending portions, for example forks of a lifting carriage. In certain examples, the adapter 8 is a conventional component that is manufactured by the OEM manufacturer of the vehicle 6. The adapter 8 permits different attachments (e.g., buckets, forks, hydraulically actuated augers), either manufactured by the manufacturer or third parties, to be easily coupled to the vehicle 6. In certain examples, the adapter 8 has hydraulically actuated hooks or couplers that can be actuated to engage and secure the adapter 8 to the attachment and therefore the vehicle 6. In one specific example, the vehicle 6 does not need lifting forks to connect to and/or lift the system 10 and instead, the actuated hooks or couplers of the adapter 8 engage with the attachment bracket 60.

The attachment bracket 60 is exemplarily configured to facilitate connection to a variety of adapters 8 and/or lifting forks manufactured by different manufacturers, and the attachment bracket 60 exemplarily includes numerous openings, support elements (e.g., hooks, reinforced plate sections), and the like that facilitate connection of the attachment bracket 60 to the variety of adapters 8. The attachment bracket 60 is coupled to the rear 24 of the base 20. The attachment bracket 60 extends transverse to the base 20, and in certain examples, a least a portion of the attachment bracket extends above an upper or first plane 701 (FIG. 7) of the base 20 in which the top surface 31 of the plate 30 extends or below a lower or second plane 702 (FIG. 7) of the base 20 in which a bottom surface of the rails 33 extends.

Figure 5:
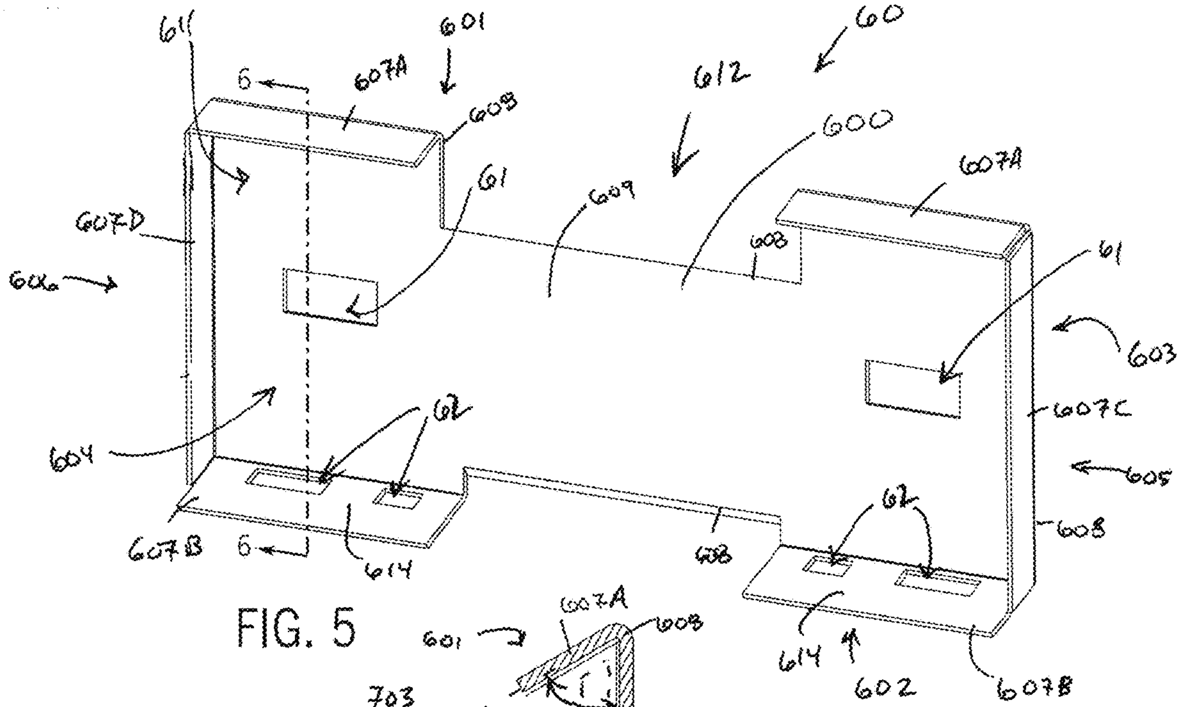
FIG. 5 is a perspective view of an example attachment bracket of the system.
Figure 6:
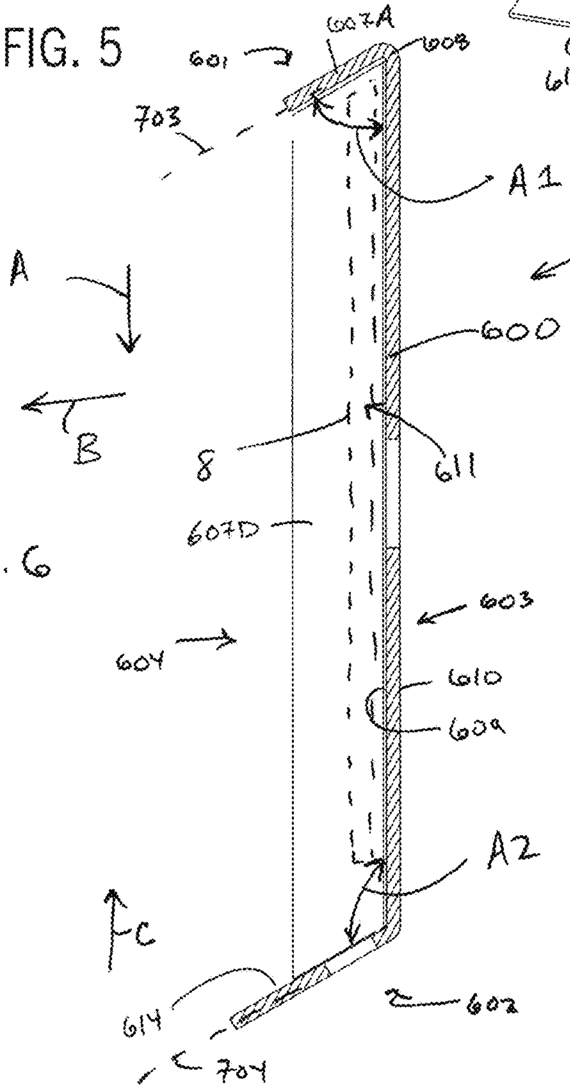
FIG. 6 is a cross-sectional view of the attachment bracket along line 6-6 on FIG. 5.

FIGS. 5-6 depict an example attachment bracket 60 in more detail. The attachment bracket 60 includes a body 600 with a top 601, a bottom 602, a front 603, a rear 604, and a pair of opposing sides 605, 606. The body 600 includes a first surface 609 which faces the vehicle 6 and opposing second surface 610 which faces the rest of the system 10. The attachment bracket 60 also includes one or more lips 607A-D that extend from the outer perimeter 608 in a direction away from the first surface 609, exemplarily in the direction of the vehicle 6. Top lip 607A extends from the top 601 of the body 600. Bottom lip 607B extends from the bottom 602 of the body 600. In examples, the top lip 607A and the bottom lip 607B may be continuous along these sides of the body 600, or as depicted in FIG. 5, the top lip 607A and the bottom lip 607B may be bifurcated by a central cutout 612. The central cutout 612 may exemplarily accommodate a variety of adapters 8 across types of vehicles 6. Top lip 607A along the top 601 is downwardly angled away from the first surface 609 and define a first angle A1 between the top lip 607A and the first surface 609. Bottom lip 607B along the bottom 602 is also downwardly angled away from the first surface 609 and define a second angle A2 between the bottom lip 607B and the first surface 609. The top lip 607A and the bottom lip 607B may be parallel. Alternatively angles A1 and A2 may be different. In certain examples, the adapter 8 is moved into the space 611 at least partially defined between the first surface 609 and the lips 607A-D. The angles A1, A2 can vary, and in the example depicted on FIG. 6 the first angle A1 is 45.0 degrees and the second angle A2 is 135.0 degrees. In certain examples, the top lips 607A extend in a first plane 703 and the bottom lips 607B extend in a second plane 704 that is parallel to the first plane 703.

In the example depicted in FIG. 6, the system 10 bears on the adapter 8 (depicted exemplarily in dashed lines on FIG. 6 for clarity) via the attachment bracket 60 and the top lip 607A. The adapter 8 exemplarily contacts the surface 609, while the top lip 607A of the attachment bracket 60 rests on the adapter 8 by force of gravity. The downward angle of the top lip 607A promotes engagement between the adapter 8 and the attachment bracket 60. This helps to prevent lateral movement of the attachment bracket 60 relative to the adapter 8 of the vehicle 6 to thereby prevent inadvertently decoupling of the attachment bracket 60 and the adapter 8 (e.g., the top lips 607A prevent the attachment bracket 60 from inadvertently moving in the vertically downward or a direction away from the vehicle 6 relative to the adapter 8).

The bottom lip 607B exemplarily defines a cam surface 614, during engagement, the adapter 8 is positioned below the top lip 607A and moved relatively towards the surface 609. It will be recognized that the same relative movement may occur by moving the system 10 towards the vehicle 6. A lower end of the adapter engages the bottom lip 607B which cams the adapter 8 in a vertically upward direction (see arrow C) as the adapter 8 is relatively moved toward the attachment bracket 60 (see arrow D). In this manner, the adapter 8 is guided into position between the first surface 609 and the top lip 607A. The cam surface 614 advantageously assists an operator to properly proper position the adapter 8 within the space 611 defined by the surface 609 and the lips 607A-D to connect the adapter to the attachment bracket 60. To decouple the adapter 8 from the system 10, the adapter 8 is moved downwardly until the system 10 rests on the ground and is unloaded from the adapter 8, such that the weight of the system no longer bears on the adapter (e.g., the rails 33 rest of the ground, the legs 50 support the system 10 on the ground). The operator then moves in the adapter 8 in a vertically downward direction (see arrow A on FIG. 6) and then in a direction away from (see arrow B on FIG. 6) the attachment bracket 60.

The side lips 607C and 607D extend away from the surface 609 at the sides 605, 606 of the body 600. As noted above the side lips 607C, 607D also prevent the attachment bracket 60 from inadvertently decoupling from the adapter 8 in a direction toward or away relative to the sides 25, 26 (FIG. 2) of the system 10 (e.g., the side lips 607C-D prevent the attachment bracket 60 from inadvertently moving in a lateral direction that extends away from one the sides 25, 26 relative to the adapter 8).

The body 600 of the attachment bracket 60, includes apertures 61. The apertures are configured to receive components which may extend from the vehicle 6 or the adapter 8 of the vehicle 6. In an example, the apertures 61 are aligned with the rails 33, such that a fork or forks (not pictured) from the vehicle 6 may extend through the apertures 61 and into the rails 33 to further lift and support the system 10 with the vehicle 6. Reinforcing plate(s) (not depicted) welded to and layered on the attachment bracket 60 to thereby increase the structural strength of the attachment bracket 60. Apertures 62 may also be formed through the cam surface 614 of the bottom lip 607B. Apertures 62 may be configured to receive hooks extending from the adapter 8 or the vehicle 6. When a hook or hooks from the adapter 8 or the vehicle 6 are secured through one or more of the apertures 62, this may further secure the attachment bracket 60 to the adapter 8 and may also obstruct the adapter 8 from disengaging from the attachment bracket 60. The hooks may obstruct the adapter 8 from moving downwards and outwards relative to the surface 609 and the cam surface 614 to withdraw the adapter 8 from within the space 611 and disengage the attachment bracket 60.

While not depicted, the attachment bracket 60 may further include hooks that extend from the attachment bracket 60 for further connection to the vehicle 6 to prevent the attachment bracket 60 for inadvertently decoupling from the adapter 8 of the vehicle 6. In certain examples, a barrier rail (not depicted) extends from the top of the attachment bracket 60 and provides another point of attachment for components of the vehicle 6 to the system 10, a safety tie-off point, and/or a point of attachment for other equipment and/or material to the attachment bracket 60 and the system 10.

The attachment bracket 60 is secured (e.g., welded) to the rear 24 of the base 20, and the attachment bracket 60 extends transverse to the top surface 21 of the base 20. Thus, the attachment bracket 60 also acts as a barrier between the vehicle 6 and the mast 40 and/or the legs 50 of the system 10. In certain examples, one or more braces (not depicted) extend between the attachment bracket 60 and the top surface 21 of the base 20 to thereby prevent the base 20 from disconnecting from the attachment bracket 60. The braces are welded to the base 20 and the attachment bracket 60. In other examples, nuts and bolts secure the braces to the base 20 and the attachment bracket 60.

As described above, in certain examples, the vehicle 6 is coupled to the system 10 via the adapter 8 and the attachment bracket 60. The coupled vehicle 6 acts as a counterweight for the system 10 such that the system 10 and the workers or materials supported therefrom (see above) are adequately supported by the system. Additional counterweights can be coupled to the vehicle 6 and/or the base 20 to increase the lifting capacity of the system 10. Also note that in other examples, counterweight could be coupled to the attachment bracket 60 after the vehicle 6 is decoupled therefrom.

In the example depicted in FIGS. 7, the actuators (noted above) of the system 10 are connected to an actuating system 720 (e.g., hydraulic system, electrical power system) of the vehicle 6 via a manifold 55. Hydraulic hoses 56 extend from the manifold 55 and are connected to the vehicle 6. The on-board and/or internal lines of the system 10 that connect the different actuators and devices of the system's 10 hydraulic system is are not depicted for clarity. An electrical line 59 may further electrically connect the system 10 to the electrical system of the vehicle via the manifold 55. As such, comments of the system 10 can be electrically powered by the vehicle 6. Note that the manifold 55 can include an outlet, port, junction box, and/or any type of electrical device that facilitates transfer of electrical power between the vehicle 6 and/or various components of the system 10. In certain examples, the worker uses the vehicle 6 to provide electrical power and/or command signals to the system 10 via the electrical line 59. Note that in other examples, the actuators (noted above) that actuate the components of the system 10 such as the mast 40, the jib 42, and/or the legs 50, 53 may be electric actuators such as electric motors or pistons. In these examples, the vehicle 6 may provide electrical power to thereby power the electric actuators. In certain examples, the manifold 55 is part of a manifold assembly that includes one or more pumps (not depicted) such that the manifold assembly pumps hydraulic fluid to the actuators (described above).

In certain examples, the manifold 55 of the system 10 receives hydraulic fluid from the vehicle 6 via the hydraulic hoses 56 and routes the hydraulic fluid to the hydraulic devices of the system 10. The hydraulic fluid is thus pumped through various valves and/or lines (not depicted), which can be internal or external to the manifold 55, to the hydraulic devices of the system 10. For example, hydraulic fluid is pumped through a flexible line (not depicted) to the hydraulic cylinder to thereby operate and move the leg 50 into and/between different positions (see FIGS. 1 and 4). The manifold 55 can receive hydraulic fluid from the vehicle 6, route the hydraulic fluid to the actuators (noted above), and further dispense the hydraulic fluid back to the vehicle 6 such that the hydraulic fluid flows in a closed-loop path.

Note that in other examples, the system 10 includes an hydraulic system that is independent from the hydraulic system of the vehicle 6. As such, components of the system 10 can be operated without being connected to the hydraulic system of the vehicle 6. The hydraulic system can include an on-board hydraulic tank 71. The system 10 can also include an independent electrical system and power source (battery) such that the system 10 is self-powered. The power source on the system 10 can be rechargeable. In other examples, the actuator system (either hydraulic system or electrical system) for the system 10 can be a stand-alone actuator unit which can be moved relative to the system(s) 10. As such, the stand-alone actuator unit can be placed near the system 10 and coupled to the system 10. In certain instances, the stand-alone unit is capable of providing power to more than one system 10.

In addition to those examples described herein, the mast 40, the jib 42, and/or the legs 50 can be manually operable such that hydraulic fluid is not necessary. Also note that in certain examples, the system 10 includes an inclination sensor (not depicted) disposed between the jib 42 and the cable 43. The inclination sensor provides an indication of a relative direction between the worker in the harness 44 supported via the jib 42. The inclination sensor can be any type of relative position sensor such as a digital level, a tilt sensor, a gyroscope, or the like.

Figure 2:
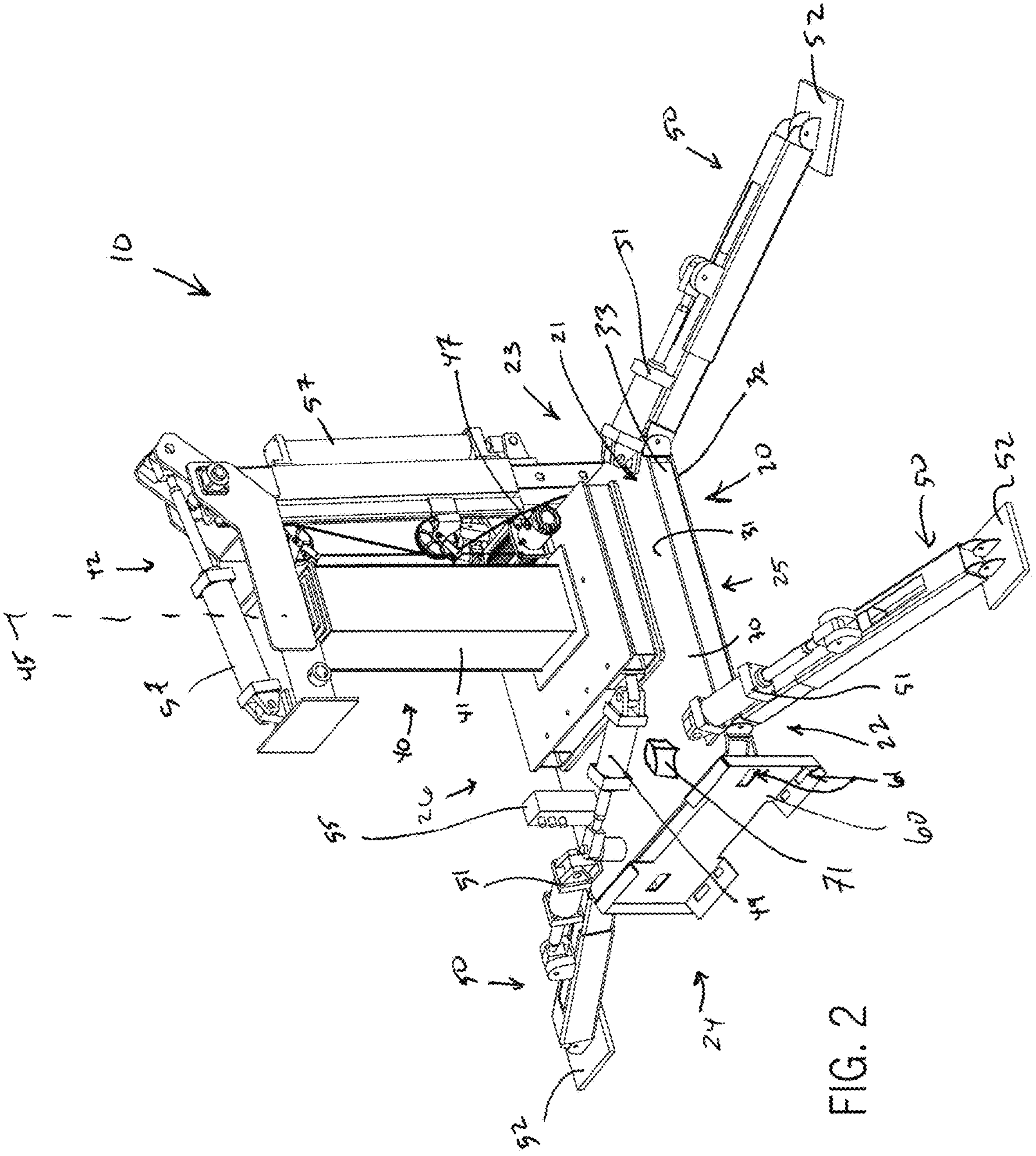
FIGS. 2-3 are perspective views of the system of FIG. 1 in a support configuration.
Figure 3:
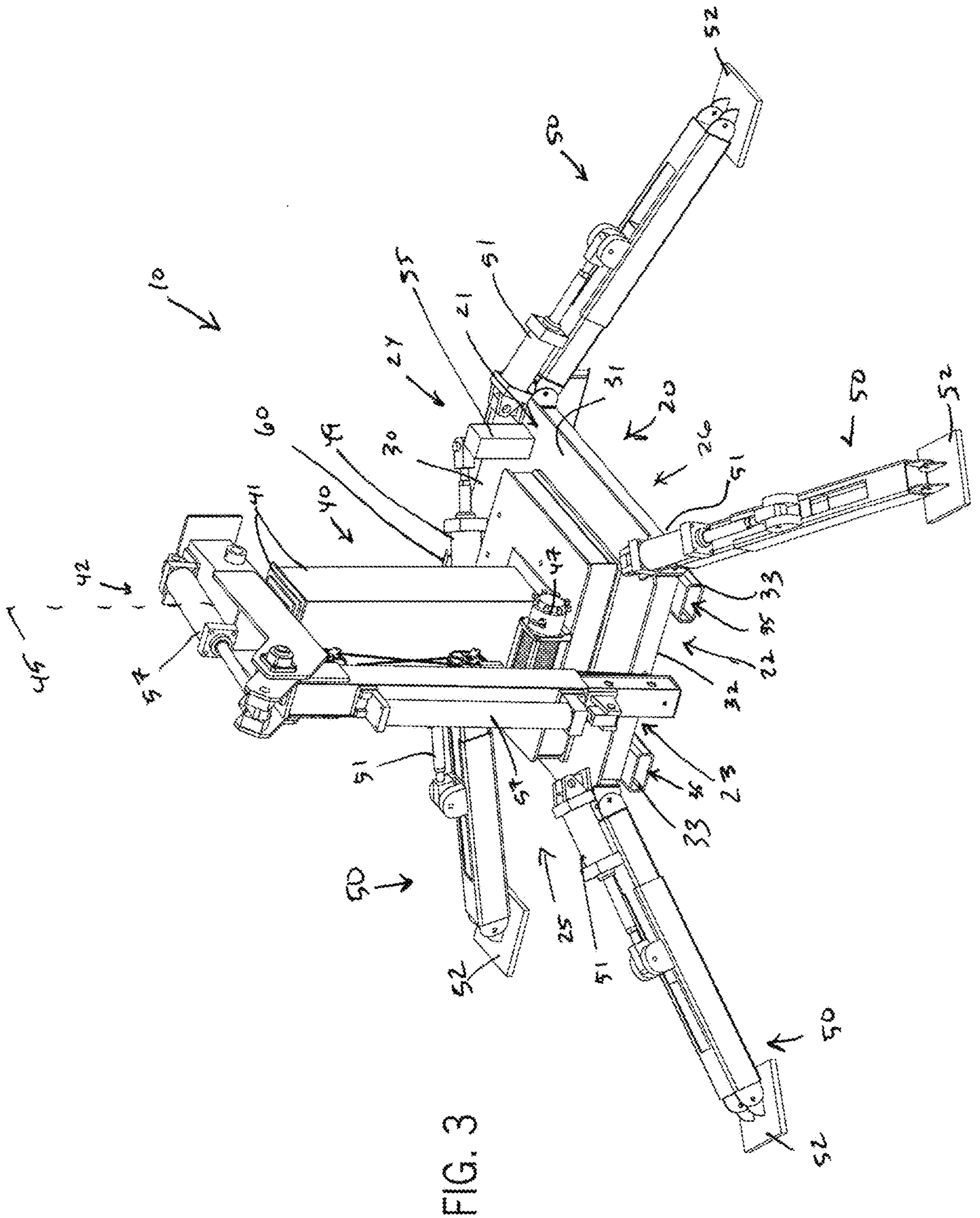

In other examples, the actuators (noted above) of the system 10 are connected to an actuating system 720 (e.g., hydraulic system, electrical power system) that is independent from the vehicle 6 and incorporated into or on various components of the system 10 such as the base 20 or the mast 40. Note that the various hoses and/or electrical wires are not depicted in the Figures for this example. In examples of the actuating system 720 being a hydraulic system an on-board hydraulic tank 71 (FIG. 2). In examples of the actuating system 720 being an electrical power system a power source (e.g., battery) in on the system 10. The power source on the system 10 can be rechargeable.

The system 10 can include a controller 80 (FIG. 7; described further hereinbelow) may provide control signals to the hydraulic devices that actuate the components of the system 10 such as the mast 40, the jib 42, and/or the legs 50, 53. Reference is made to U.S. Pat. No. 9,623,270 (incorporated hereinabove) that discloses examples of other personal safety systems and apparatuses (and components thereof) including masts, jibs, and legs that can be combined with the systems 10 described in the present disclosure. The controller 80 is depicted on FIG. 7 as coupled to the manifold 55. However, in other examples the controller 80 is contained within a handheld remote (not depicted) that can be carried by the worker. Note that in still further examples, the controller 80 can be remotely coupled to the vehicle 6. The controller 80 receives inputs from the operator via mechanical push buttons, user interface devices (e.g., touch screen) or the like and outputs controls signals to the components of the system 10. The components of the system (e.g., hydraulic cylinder 51, valves) are in electronic communication with the controller 80 via wired or wireless links. The controller 80 can include a processing system and a memory system with programs and/or data stored thereon. In one example, the controller 80 receives inputs from the operator and based on the inputs executes one or more programs stored on the memory system. The controller 80 advantageously allows the system 10 to be controlled independent of the vehicle 6. In one example operation, the controller 80 may execute a program stored on the memory system such that the controller 80 operates the hydraulic cylinders 51 to move the legs 50 into the ground engaging positions (FIG. 2) and/or level the system 10 based on the feedback from the leveling assemblies 58 and/or a level sensor (not depicted) that sends level feedback signals to the controller 80. In another example, the controller 80 can also be configured to "lock-out" the drive train on the vehicle 6 when the system 10 is being operated and/or when the mast 40 is in a raised configuration to thereby increase stability of the system 10. Note that in other example, the system 10 is controlled by the controller 80 and/or controller of the vehicle 6. In this example, the signals from the controller of the vehicle 6 are sent to the system 10 wirelessly or via a wired connection.

Note that in certain examples, the system 10 can be paired with another system such that the systems 10 can together lift loads. One or more vehicles 6 can also be coupled to the systems 10. For example, two systems 10 each coupled to a separate vehicle can be placed next to a rail car and spaced apart from each other. In this example, the systems 10 are configured to communicate with each other and thereby together lift materials or support a fall protection beam that extends between the systems 10 (such that one or more workers can tie off to the beam and work on an elevated surface of the rail car). Thus, the systems 10 and vehicle(s) 6 act together as a single fall protection system.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A personal safety system for coupling to an adapter of a vehicle and lifting material or supporting a person therefrom, the personal safety system comprising:
- a base;
- a mast coupled to the base and the mast is movable into and between a lowered configuration and an extended configuration;
- a jib coupled to the mast and a cable coupled to the jib, the cable configured to couple to the material or the person such that the personal safety system is capable of lifting the material or supporting the person; and
- an attachment bracket coupled to the base and configured to couple the personal safety system to the adapter, the attachment bracket has a plate with a first surface that is configured to face the vehicle and engage the adapter, the first surface extends transverse to the base; and wherein the attachment bracket includes a lip that extends in a direction away from the first surface, and wherein the lip is configured to engage the adapter.

2. The personal safety system according to claim 1, wherein the first surface extends perpendicular to the base.

3. The personal safety system according to claim 1, wherein the lip and the first surface define an acute angle therebetween.

4. The personal safety system according to claim 1, wherein the attachment bracket has a second surface opposite the first surface that faces the base.

5. The personal safety system according to claim 1, wherein the attachment bracket defines at least one aperture that is configured to permit passage of a component of the adapter therethrough.

6. A personal safety system for coupling to an adapter of a vehicle and lifting material or supporting a person therefrom, the personal safety system comprising:
- a base;
- a mast coupled to the base and the mast is movable into and between a lowered configuration and an extended configuration;
- a jib coupled to the mast and a cable coupled to the jib, the cable configured to couple to the material or the person such that the personal safety system is capable of lifting the material or supporting the person; and
- an attachment bracket coupled to the base and configured to couple the personal safety system to the adapter, the attachment bracket has a first surface that is configured to face the vehicle and engage the adapter, the first surface extends transverse to the base; and wherein the attachment bracket has a top, an opposite bottom, a top lip along the top, and a bottom lip along the bottom.

7. The personal safety system according to claim 6, wherein the top lip and the bottom lip are both angled downwardly relative to the first surface.

8. The personal safety system according to claim 6, wherein the top lip extends in a first plane and the bottom lip extends in a second plane that is parallel to the first plane.

9. A personal safety system for coupling to an adapter of a vehicle and lifting material or supporting a person therefrom, the personal safety system comprising:
- a base;
- a mast coupled to the base and the mast is movable into and between a lowered configuration and an extended configuration;
- a jib coupled to the mast and a cable coupled to the jib, the cable configured to couple to the material or the person such that the personal safety system is capable of lifting the material or supporting the person; and an attachment bracket coupled to the base and configured to couple the personal safety system to the adapter, the attachment bracket includes a plate with a first surface that is configured to face the vehicle and engage the adapter and an opposite second surface that faces the mast; and wherein the attachment bracket includes a lip that extends in a direction away from the first surface, and wherein the lip is configured to engage the adapter.

10. The personal safety system according to claim 9, wherein the first surface extends perpendicular to the base.

11. The personal safety system according to claim 9, wherein the lip and the first surface define an acute angle therebetween.

12. A personal safety system for coupling to an adapter of a vehicle and lifting material or supporting a person therefrom, the personal safety system comprising:

a base;

a mast coupled to the base and the mast is movable into and between a lowered configuration and an extended configuration;

a jib coupled to the mast and a cable coupled to the jib, the cable configured to couple to the material or the person such that the personal safety system is capable of lifting the material or supporting the person; and an attachment bracket coupled to the base and configured to couple the personal safety system to the adapter, the attachment bracket includes a plate with a first surface that is configured to face the vehicle and engage the adapter and an opposite second surface that faces the mast; and wherein the attachment bracket has a top, an opposite bottom, a top lip along the top, and a bottom lip along the bottom.

13. The personal safety system according to claim 12, wherein the top lip and the bottom lip are both angled downwardly relative to the first surface.

14. The personal safety system according to claim 12, wherein the top lip extends in a first plane and the bottom lip extends in a second plane that is parallel to the first plane.

15. A personal safety system for coupling to an adapter of a vehicle and lifting material or supporting a person therefrom, the personal safety system comprising:

a base;

a mast coupled to the base and the mast is movable into and between a lowered configuration and an extended configuration;

a jib coupled to the mast and a cable coupled to the jib, the cable configured to couple to the material or the person such that the personal safety system is capable of lifting the material or supporting the person; and an attachment bracket coupled to the base and configured to couple the personal safety system to the adapter, the attachment bracket includes a plate with a first surface that is configured to face the vehicle and engage the adapter and an opposite second surface that faces the mast; and a plurality of legs configured to engage the ground and a leveling assembly for leveling the personal safety system relative to the ground, wherein one or more legs of the plurality of legs are coupled to the base and one or more legs of the plurality of legs are coupled to the vehicle.

16. A personal safety system for coupling to an adapter of a vehicle and lifting material or supporting a person therefrom, the personal safety system comprising:

a base;

a mast coupled to the base and the mast is movable into and between a lowered configuration and an extended configuration;

a jib coupled to the mast and a cable coupled to the jib, the cable configured to couple to the material or the person such that the personal safety system is capable of lifting the material or supporting the person; and an attachment bracket coupled to the base and configured to couple the personal safety system to the adapter, the attachment bracket has a body and a lip that extends away from the body, and wherein the lip is configured to engage the adapter of the vehicle.

17. The personal safety system according to claim 16, wherein the lip and the body define an acute angle therebetween.

* * * * *